United States Patent
Hsu

(10) Patent No.: US 7,994,937 B2
(45) Date of Patent: Aug. 9, 2011

(54) CONTROL CIRCUIT FOR AN LED TRAFFIC LIGHT USING A PULSE WIDTH MODULATION SIGNAL

(75) Inventor: Ming-Yuan Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 544 days.

(21) Appl. No.: 12/168,534

(22) Filed: Jul. 7, 2008

(65) Prior Publication Data
US 2009/0267795 A1 Oct. 29, 2009

(30) Foreign Application Priority Data
Apr. 28, 2008 (CN) .......................... 2008 1 0301327

(51) Int. Cl.
*G08B 21/00* (2006.01)
(52) U.S. Cl. .................... 340/907; 315/185 R; 363/89
(58) Field of Classification Search .................. 340/907; 315/185 R, 193, 216, 322; 363/80, 89
See application file for complete search history.

(56) References Cited

U.S. PATENT DOCUMENTS
2002/0158590 A1* 10/2002 Saito et al. .................... 315/291
* cited by examiner

*Primary Examiner* — Jeffery Hofsass
(74) *Attorney, Agent, or Firm* — Andrew C. Cheng

(57) ABSTRACT

A control circuit for traffic light includes a pulse control circuit, a control switch element, a control drive circuit, a power source, and an LED. The pulse control circuit includes a control chip is capable of outputting a low level signal and a pulse-width modulation (PWM) signal by turns. The duration of the low level signal is longer than that of the PWM signal. The control drive circuit for receiving the signals output from the control chip and controlling the control switch element. The LED is connected to the power source via the control switch element. The switch element is configured to control the power source to supply power to the LED when the signals output from the control chip are high, and does not supply power to the LED when the signals output from the control chip are low.

18 Claims, 2 Drawing Sheets

CONTROL CIRCUIT FOR AN LED TRAFFIC LIGHT USING A PULSE WIDTH MODULATION SIGNAL

BACKGROUND

1. Field of the Invention

The present invention relates to control circuits, and especially relates to a control circuit for a traffic light.

2. Description of Related Art

With development of technologies, urban modernization has accelerated, and more vehicles are on the roads than ever before, consuming more and more energy resources. In the mid 1990s, in an effort to help conserve energy, cost-effective traffic lights using LEDs were developed to replace light bulbs.

What is needed, is a an energy efficient control circuit for the LED traffic lights.

DETAILED DESCRIPTION

Figure 1:
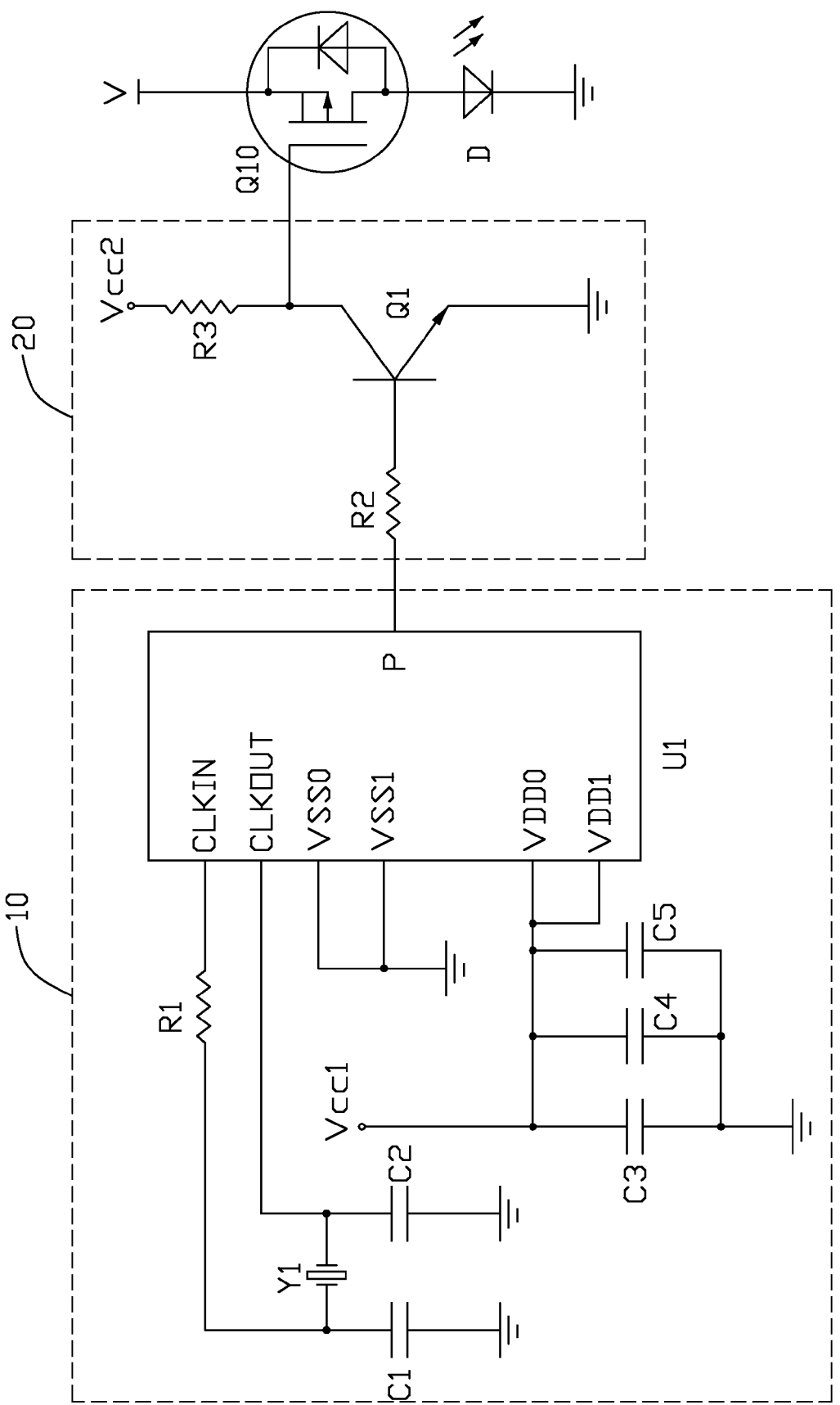
FIG. 1 is a circuit diagram of a control circuit for a traffic light in accordance with an exemplary embodiment of the present invention.

Referring to FIG. 1, a control circuit for a traffic light in accordance with an exemplary embodiment of the present invention includes a pulse control circuit 10, a control drive circuit 20, a control switch element Q10, a power source V, and an LED D.

The pulse control circuit 10 includes a control chip U1, five capacitors C1-C5, a crystal oscillator Y1, and a resistor R1. The control chip U1 includes a clock input pin CLKIN, a clock output pin CLKOUT, two voltage pins VDD0 and VDD1, two ground pins VSS0 and VSS1, and an output pin P. The clock input pin CLKIN is grounded via the series connected resistor R1 and the capacitor C1. The clock output pin CLKOUT is grounded via the capacitor C2. One end of the crystal oscillator Y1 is connected to a node between the resistor R1 and the capacitor C1. The other end of the crystal oscillator Y1 is connected to the clock output pin CLKOUT. The ground pins VSS0 and VSS1 are grounded. The voltage pins VDD0 and VDD1 are connected to a voltage source Vcc1. The voltage source Vcc1 is grounded via the capacitor C3. The capacitors C4, C5 and C3 are connected between the voltage source Vcc1 and ground in parallel. The output pin P is connected to the control drive circuit 20. In this embodiment, the control chip U1 may be a PIC16F847A chip.

The control drive circuit 20 includes a drive switch element Q1 and two resistors R2, R3. In this embodiment, the drive switch element Q1 may be a Negative-Positive-Negative (NPN) transistor and will further be described as such. The base of the transistor Q1 is connected to the output pin P of the control chip U1 via the resistor R2. The collector of the transistor Q1 is connected to a voltage source Vcc2 via the resistor R3 and the control switch element Q10. The emitter of the transistor Q1 is grounded.

In this embodiment, the control switch element Q10 may be a P-channel field effect transistor (FET) and will further be described as such. The gate of the Q10 is connected to the collector of the transistor Q1. The drain of the FET Q10 is connected to the LED D. The source of the FET Q10 is connected to the power source V.

In use, the crystal oscillator Y1 provides a clock signal to the control chip U1. The control chip U1 is programmed to control the output pin P of the control chip U1 to alternately output a low level signal and a pulse-width modulation (PWM) signal by turns. When the control chip U1 outputs a high level signal, the transistor Q1 is turned on. The collector of the transistor Q1 outputs a low level signal. The FET Q10 is turned on. The power source V provides a voltage to the LED D. The LED D is lit up. When the control chip U1 outputs a low level signal, the transistor Q1 and the FET Q10 are turned off. The power source V does not provide voltage to the LED D. The LED D does not light.

Figure 2:
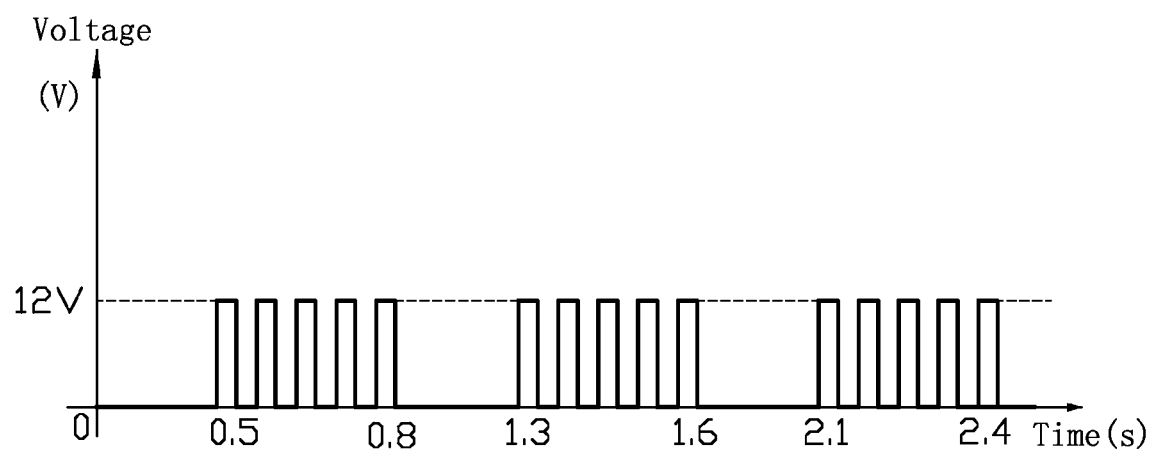
FIG. 2 is a waveform chart of FIG. 1.

Referring to FIG. 2, in this embodiment, the control chip U1 is programmed to control the output pin P of the control chip U1 to alternately output a low level signal for 0.5 seconds, and output a PWM signal for 0.3 seconds. The frequency of the PWM signal from the output pin P of the control chip U1 is greater than 50 HZ so that the blinking of the LED D is not noticeable to human eyes. When the control chip U1 outputs the PWM signal, the LED D is lit up and gone out by turns instead of constantly on for 0.3 seconds. Therefore, the control circuit for a traffic light can save power.

In this embodiment, the LED is powered by 12 volts, and 3 amperes of current. The duty cycle of the PWM signal from the output pin P of the control chip U1 is 18 percent. Therefore, the power consumption of the LED is 12V*3A*[0.3/(0.5+0.3)]*18%=2.43W. Whereas the conventional LED control circuit flashes on for 0.3 seconds and then off for 0.5 seconds in turn, and consumes 12V*3A*[0.3/(0.5+0.3)]=13.5W of power. And even though the control chip U1 in this embodiment is programmed to control the output pin P of the control chip U1 to alternately output the PWM signal, human eyes register a steady light. Therefore, the control circuit for traffic light can save power while still providing a satisfactory level of performance.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A control circuit for traffic light comprising:
a pulse control circuit, comprising a control chip capable of outputting a low level signal and a pulse-width modulation (PWM) signal by turns, wherein the duration of the low level signal is longer than that of the PWM signal;
a control switch element;
a control drive circuit for receiving the signals output from the control chip and controlling the control switch element, wherein the control drive circuit comprises a drive switch element, the drive switch element comprises:
a first drive switch terminal connected to the control chip;

a second drive switch terminal connected to the control switch element and also connected to a voltage source through a first drive circuit resistor; and
a third drive switch terminal that is grounded;
a power source; and
an LED connecting to the power source via the control switch element;
wherein the switch element is configured to control the power source to supply power to the LED when the signals output from the control chip are high, and not to supply power to the LED when the signals output from the control chip are low.

2. The control circuit as claimed in claim 1, wherein the pulse control circuit further comprises:
a crystal oscillator providing a clock signal to the control chip;
wherein the control chip comprises:
two voltage pins connected to a voltage source;
an output pin connected to the first drive switch terminal of the drive switch element of the control drive circuit;
a clock input pin; and
a clock output pin;
wherein the crystal oscillator is connected between the clock input pin of the control chip and the clock output pin of the control chip.

3. The control circuit as claimed in claim 2, wherein the pulse control circuit further comprises a first capacitor, a second capacitor, a third capacitor, a fourth capacitor, a fifth capacitor, and a resistor; the first capacitor is connected between one end of the crystal oscillator and the ground; the second capacitor is connected between the other end of the crystal oscillator and the ground; the third, the fourth, and the fifth capacitors, connected in parallel, are connected between the voltage pin and ground; the resistor is connected between the clock input pin of the control chip and the crystal oscillator.

4. The control circuit as claimed in claim 1, wherein the control drive circuit further comprises a second drive circuit resistor, the second drive circuit resistor is connected between the output pin of the control chip and the first drive switch terminal.

5. The control circuit as claimed in claim 1, wherein the drive switch element is a Negative-Positive-Negative (NPN) transistor; the first drive switch terminal is the base, the second drive switch terminal is the collector, and the third drive switch terminal is the emitter of the NPN transistor.

6. The control circuit as claimed in claim 5, wherein the control switch element comprises:
a first control switch terminal connected to the collector of the transistor;
a second control switch terminal connected to the LED; and
a third control switch terminal connected to the power source.

7. The control circuit as claimed in claim 6, wherein the control switch element is a P-channel field effect transistor, the first control switch terminal is the gate, the second control switch terminal is the drain, and the third control switch terminal is the source of the P-channel field effect transistor.

8. The control circuit as claimed in claim 1, wherein the duty cycle of the PWM signal is 18 percent.

9. The control circuit as claimed in claim 1, wherein the frequency of the PWM signal is greater than 50 HZ.

10. A method for controlling a traffic light, the method comprising of:
providing:
a pulse control circuit, comprising a control chip that outputs a low level signal and a pulse-width modulation (PWM) signal by turns, wherein the duration of the low level signal is longer than that of the PWM signal;
a control switch element;
a control drive circuit receives the signals output from the control chip and controls the control switch element, wherein the control drive circuit comprises a drive switch element, the drive switch element comprises:
a first drive switch terminal connected to the control chip;
a second drive switch terminal connected to the control switch element and also connected to a voltage source through a first drive circuit resistor; and
a third drive switch terminal that is grounded;
a power source; and
an LED connecting to the power source via the control switch element;
wherein the switch element controls the power source that supplies power to the LED when the signals output from the control chip are high, and does not supply power to the LED when the signals output from the control chip are low.

11. The method as claimed in claim 10, wherein the pulse control circuit further comprises:
a crystal oscillator providing a clock signal to the control chip;
wherein the control chip comprises:
two voltage pins connected to a voltage source;
an output pin connected to the first drive switch terminal of the drive switch element of the control drive circuit;
a clock input pin; and
a clock output pin;
wherein the crystal oscillator is connected between the clock input pin of the control chip and the clock output pin of the control chip.

12. The method as claimed in claim 11, wherein the pulse control circuit further comprises a first capacitor, a second capacitor, a third capacitor, a fourth capacitor, a fifth capacitor, and a resistor; the first capacitor is connected between one end of the crystal oscillator and the ground; the second capacitor is connected between the other end of the crystal oscillator and the ground; the third, the fourth, and the fifth capacitors, connected in parallel, are connected between the voltage pin and ground; the resistor is connected between the clock input pin of the control chip and the crystal oscillator.

13. The method as claimed in claim 10, wherein the control drive circuit further comprises a second drive circuit resistor, the second drive circuit resistor is connected between the output pin of the control chip and the first drive switch terminal.

14. The method as claimed in claim 10, wherein the drive switch element is a Negative-Positive-Negative (NPN) transistor; the first drive switch terminal is the base, the second drive switch terminal is the collector, and the third drive switch terminal is the emitter of the NPN transistor.

15. The method as claimed in claim 14, wherein the control switch element comprises:
a first control switch terminal connected to the collector of the transistor;
a second control switch terminal connected to the LED; and
a third control switch terminal connected to the power source.

16. The method as claimed in claim 15, wherein the control switch element is a P-channel field effect transistor, the first control switch terminal is the gate, the second control switch terminal is the drain, and the third control switch terminal is the source of the P-channel field effect transistor.

17. The method as claimed in claim 10, wherein the duty cycle of the PWM signal is 18 percent.

18. The method as claimed in claim 10, wherein the frequency of the PWM signal is greater than 50 HZ.

* * * * *